(12) United States Patent
Xin

(10) Patent No.: US 7,068,221 B2
(45) Date of Patent: Jun. 27, 2006

(54) TECHNIQUE FOR DIRECTION-OF-ARRIVAL ESTIMATION WITHOUT EIGENDECOMPOSITION AND ITS APPLICATION TO BEAMFORMING AT BASE STATION

(75) Inventor: Jingmin Xin, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/170,326

(22) Filed: Jun. 29, 2005

(65) Prior Publication Data

US 2005/0285788 A1    Dec. 29, 2005

Related U.S. Application Data

(63) Continuation of application No. PCT/JP03/006411, filed on May 22, 2003.

(51) Int. Cl.
*G01S 5/04*    (2006.01)

(52) U.S. Cl. ........................ 342/432; 342/442
(58) Field of Classification Search ............ 342/417, 342/432, 437, 442
See application file for complete search history.

(56) References Cited

U.S. PATENT DOCUMENTS 5,262,789 A * 11/1993 Silverstein .................. 342/368
5,299,148 A * 3/1994 Gardner et al. ............. 702/196
6,822,606 B1 * 11/2004 Ponsford et al. ............ 342/192

FOREIGN PATENT DOCUMENTS

| JP | 9-219616 | 8/1997 |
| JP | 11-142497 | 5/1999 |
| JP | 11-231033 | 8/1999 |
| JP | 2000-111630 | 4/2000 |
| JP | 2002-243826 | 8/2002 |

OTHER PUBLICATIONS

Kohzoh Ohshima et al. A study on correlation matrix calculation for the MUSIC Algorithm. Asahikawa National College of Technology and Graduate School of Engineering, Hokkaido University, IEICE Transactions vol. J84-B No. 1 pp. 146-149.

* cited by examiner

*Primary Examiner*—Dao Linda Phan
(74) *Attorney, Agent, or Firm*—Katten Muchin Rosenman LLP

(57) ABSTRACT

An incoming radio wave is received by array antenna elements which constitute an array antenna, and the correlation between the received data of some array antenna elements is calculated to form a correlation matrix which is not affected by the additive noise at each antenna element. Then a noise subspace is obtained from the correlation matrix by a simple linear operation based on the partition of an array response matrix and is used to estimate the direction of signal (i.e., radio wave) impinging on the array antenna. Because the evaluation of all correlations between the array data received by array antenna elements is not needed, and the eigendecomposition process is avoided, the computational load of the proposed direction estimation technique is reduced, and the noise insensitivity is improved.

19 Claims, 11 Drawing Sheets

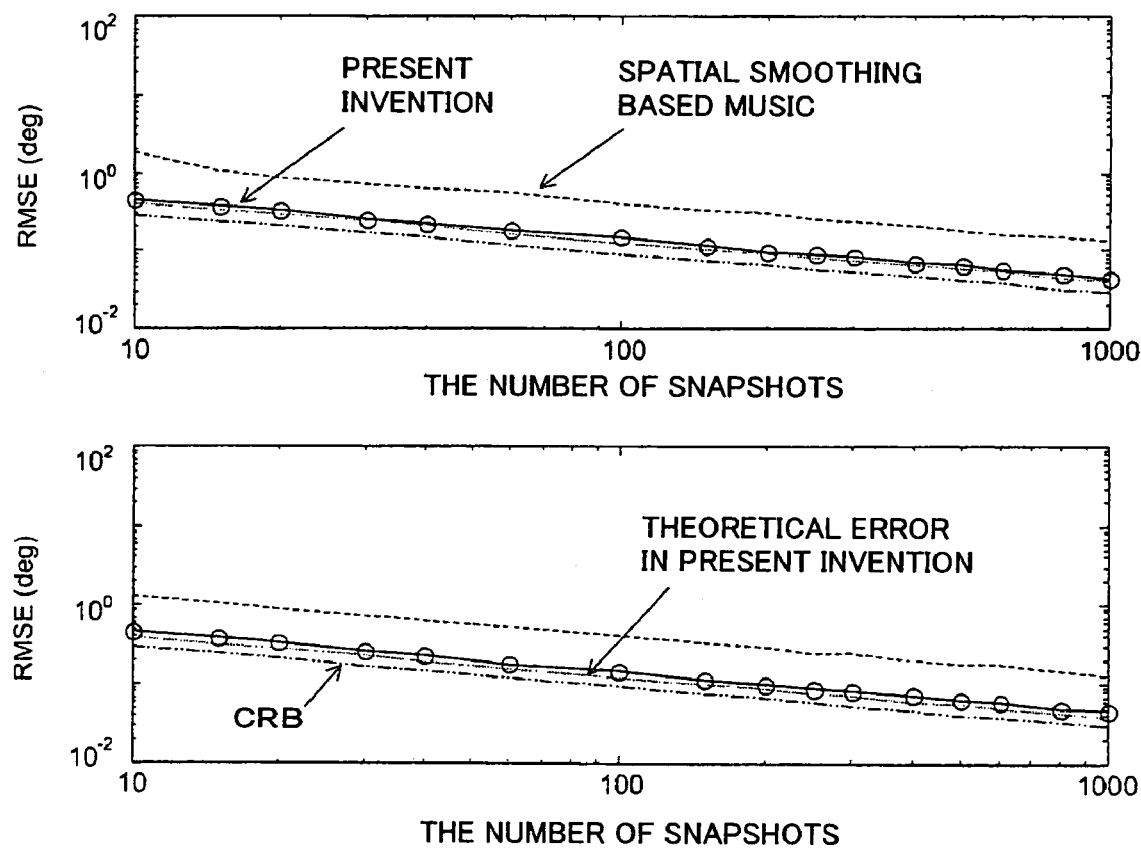
F I G. 1 0

TECHNIQUE FOR DIRECTION-OF-ARRIVAL ESTIMATION WITHOUT EIGENDECOMPOSITION AND ITS APPLICATION TO BEAMFORMING AT BASE STATION

CROSS-REFERENCE TO RELATED APPLICATION

This application is a continuation of international PCT application No. PCT/JP2003/006411, filed on May 22, 2003, currently pending, the contents of which are herein wholly incorporated by reference.

BACKGROUND OF THE INVENTION

1. Field of the Invention

This invention relates to a device for the direction-of-arrival (DOA) estimation of a radio wave impinging on an array antenna at a base station with high estimation accuracy and low computational complexity and to a receiving/transmitting device for beamforming at a base station which varies the directivity of beam of an antenna based on the estimated directions. This invention is of a technique by which the directions of incident signals (signals which are not uncorrelated to one another, or the multipath waves which are fully correlated) are estimated in a computationally efficient way and is especially a technique for estimating the directions of closely spaced incident waves with high accuracy even when the length of received data is short (i.e., the number of snapshots) and when the signal-to-noise (SNR) is low.

2. Description of the Relate Art

In recent years, the study and development of adaptive array antenna for mobile communications has gathered interest. In the adaptive array antenna, antenna elements are arrayed with a certain geometry in different spatial positions. A technique for estimating the direction-of-arrival (DOA) of a radio wave (referred to also as a "signal" from the view point of signal processing) impinges on an antenna is an important elemental technique for an adaptive array antenna. For estimating the directions of the incident signals, subspace-based methods which utilize the orthogonality between a signal subspace and a noise subspace are well known due to their high estimation accuracy and relatively low computational complexity, where the eigendecomposition such as eigenvalue decomposition (EVD) of an array covariance matrix or singular value decomposition (SVD) of an array data matrix is required to obtain a signal subspace (or a noise subspace). However, for a real installed array antenna, especially in the case where the number of array elements is larger, the calculation process for the eigendecomposition becomes computationally intensive and time-consuming.

In general, for the problem of estimating the direction-of-arrival of uncorrelated incident waves impinging on an array antenna, subspace-base methods utilizing the orthogonality between a signal subspace and a noise subspace are well known because of their relatively computational simplicity and high resolution, where the MUSIC (Multiple signal classification) is a representative method (for details of this technique, refer to "Multiple emitter location and signal parameter estimation," by R. O. Schmidt, IEEE Trans. Antennas and Propagation, vol. 34, no. 3, pp. 276–280 (1986)). Furthermore, for estimating the directions of fully correlated signals (i.e., multipath waves), the subspace-based method with spatial smoothing is usually used, for example, the spatial smoothing based MUSIC (for the details of this technique, refer to "On spatial smoothing for direction-of-arrival estimation of coherent signals," by T. J. Shan, M. Wax and T. Kailath, IEEE Trans. Acoust., Speech, Signal Processing, vol. 33, no. 4, pp. 806–811(1985), and also "Forward/backward spatial smoothing techniques for coherent signals identification," by S. U. Pillai and B. H. Kwon, IEEE Trans. Acoust., Speech, Signal Processing, vol. 37, no. 1, pp. 8–15 (1989)).

In the conventional subspace-based method for estimating the directions of uncorrelated signals, the signal subspace or noise subspace is obtained by the eigenvalue decomposition of the array covariance matrix. Then, the directions of incident signals are estimated by utilizing the orthogonality between the signal subspace and the noise subspace. However, for the direction estimation of the correlated signals (including the fully correlated signals), a uniform linear array (ULA) is usually divided into subarrays in order to suppress the coherency between incident signals and to restore the dimension of the signal subspace of the spatially averaged covariance matrix to the number of the incident signals. Accordingly, the direction estimation of the correlated signals is realized by utilizing the orthogonality between the signal subspace and the noise subspace similarly to the conventional subspace-based method.

In order to explain a demerit of the conventional subspace-based method for the direction estimation of correlated signals, the spatial smoothing based MUSIC is briefly explained as is discussed in an exemplary document "On spatial smoothing for direction-of-arrival estimation of coherent signals," by T. J. Shan, M. Wax and T. Kailath, IEEE Trans. Acoust., Speech, Signal Processing, vol. 33, no. 4, pp. 806–811 (1985).

Here, it is assumed that p narrow band signals $\{s_k(n)\}$ impinge on a uniform linear array consisting of M array elements from angles $\{\theta_k\}$ (where k=1 to p). The array received signal for each element can be expressed as $$y(n)=[y_1(n),y_2(n), \ldots, y_M(n)]^T = As(n)+w(n) \quad \text{[Equation 1]}$$

where $A=[a(\theta_1),a(\theta_2), \ldots, a(\theta_p)]$, $a(\theta_k)=[1,e^{j\omega_0 \tau(\theta_k)}, \ldots, e^{j\omega_0(M-1)\tau(\theta_k)}]^T$, $s(n)=[s_1(n),s_2(n), \ldots, s_p(n)]^T$, $w(n)=[w_1(n), w_2(n), \ldots, w_M(n)]^T$, $\omega_0=2\pi f_0$, $\tau(\theta_k)=(d/c)\sin\theta_k$. And $f_0$ is a carrier frequency, c is a propagation speed, and d is element spacing. Also, $(\bullet)^T$ means a transpose, a $(\theta_k)$ and A are respectively a response vector and a response matrix of an array. Additionally, $\{w_i(n)\}$ are temporally and spatially complex white Gaussian noise which are uncorrelated each other and has zero-mean and variance $\sigma^2$. Here, the array covariance matrix is expressed as below, $$R=E\{y(n)y^H(n)\}=AR_sA^H+\sigma^2 I_M \quad \text{[Equation 2]}$$

where $E\{\bullet\}$ and $(\bullet)H$ express an expectation operation and a complex conjugate transpose, respectively, $R_s=E\{s(n)S^H(n)\}$ is the covariance matrix of an incident signals, $I_M$ is an M×M identity matrix. Further, when the correlation $r_{ik}$ of the observation data $y_i(n)$ and $y_k(n)$ is defined by $r_{ik}=E\{y_i(n)y_k^*(n)\}$, the above array covariance matrix R can be explicitly expressed by a formula below, $$R = \begin{bmatrix} r_{11} & r_{12} & \cdots & r_{1M} \\ r_{21} & r_{22} & \cdots & r_{2M} \\ \vdots & \vdots & \ddots & \vdots \\ r_{M1} & r_{M2} & \cdots & r_{MM} \end{bmatrix} \quad \text{[Equation 3]}$$

where $r_{ik}=r^*_{ki}$, and $(\bullet)^*$ expresses the complex conjugate.

FIG. 1 explains the dividing of the uniform linear array into subarrays.

In the spatial smoothing based MUSIC, in order to estimate the arrival directions $\{\theta_k\}$ of fully correlated signals (i.e., coherent signals or multipath waves), the entire uniform linear array is divided into L overlapped subarrays consisting of m elements (where $1 \leq m \leq M$) as shown in FIG. 1, where m and L are the subarray size and the number of subarrays, respectively, and $L=M-m+1$ is satisfied. Based on the equation 1, the signal vector $y_l(n)$ of the lth subarray can be expressed by equation 4 as below, $$y_l(n)=[y_l(n), y_{l+1}(n), \ldots, y_{l+m-1}(n)]^T = A_m D^{l-1} s(n) + w_l(n)$$ [Equation 4]

where $A_m=[a_m(\theta_1), a_m(\theta_2), \ldots, a_m(\theta_p)]$ $a_m(\theta_k)=[1, e^{j\omega_0 r(\theta_k)}, \ldots, e^{j\omega_0(m-1)r(\theta_k)}]^T$, $w_l(n)=[w_l(n), w_{l+1}(n), \ldots, w_{l-m+1}(n)]^T$, D is a diagonal matrix with the elements $e^{j\omega_0 r(\theta_1)}, e^{j\omega_0 r(\theta_2)}, \ldots, e^{j\omega_0(m-1)r(\theta_p)}$, and $l=1, 2, \ldots, L$. Also, $a_m(\theta_k)$ and $A_m$ are the array response vector and response matrix of a subarray, respectively. Accordingly, the covariance matrix of the lth subarray can be expressed by equation 5 as $$R_l = E\{y_l(n)y_l^H(n)\} = A_m D^{l-1} R_s (D^{l-1})^H A_m^H + \sigma^2 I_m$$ [Equation 5]

Further, by spatially averaging the covariance matrixes $\{R_l\}$ of L subarrays, the spatially averaged covariance matrix is obtained $$\bar{R} = \frac{1}{L}\sum_{l=1}^{L} R_l$$ [Equation 6]

Then the eigenvalue decomposition of the above spatially averaged covariance matrix $\bar{R}$ can be expressed by formula 7 as below, $$\bar{R} = \sum_{i=1}^{m} \lambda_i e_i e_i^H = E \Lambda E^H$$ [Equation 7]

where $e_i$ and $\lambda_i$ are the eigenvector and eigenvalue of the matrix $\bar{R}$, respectively, E is the eigenvector matrix with $\{e_i\}$ as a column, $\Lambda$ is a diagonal matrix with the element $\{\lambda_i\}$. Also, the space spanned by the eigenvectors $\{e_1, e_2, \ldots, e_p\}$ is called the signal subspace, and the space spanned by the vectors $\{e_{p+1}, e_{p+2}, \ldots, e_m\}$ is called the noise subspace. Further, the signal subspace can be expressed by using the array response vector. The method for direction estimation based on the orthogonality between the signal subspace and the noise subspace is called a subspace-based method.

From the eigenvalue analysis of the covariance matrix $\bar{R}$ expressed by the equation 7, the orthogonality is established between the array response vector $a_m(\theta_k)$ of the subarray and the eigenvector $\{e_p, e_{p+1}, \ldots, e_m\}$ as expressed by equation 8 as below $$e_i^H a_m(\theta_k) = 0$$ [Equation 8]

where $i=p+1, \ldots, m$. Based on the above orthogonality, the spectrum $\bar{P}_{ssmusic}(\theta)$ as below can be calculated, $$\bar{P}_{ssmusic}(\theta) = \frac{1}{\sum_{i=p+1}^{m} |e_i^H a_m(\theta)|^2}$$ [Equation 9]

where $a_m(a)=[1, e^{j\omega_0 r(\theta)}, \ldots, e^{j\omega_0(m-1)r(\theta)}]^T$. In the spatial smoothing based MUSIC, the directions of incident signals is estimated based on the position of the p highest peaks of the spectrum given by equation 7.

As shown in equation 7, the subspace-based method for estimating the directions of incident signals, such as the (spatial smoothing based) MUSIC requires the eigenvalue decomposition of the array covariance matrix in order to obtain the signal subspace or the noise subspace. However, for a real installed array antenna, especially in the case where the number of array elements is larger or the varying arrival directions should be estimated in a on-line manner, the process of the eigenvalue decomposition (or the singular value decomposition) becomes computationally complex so that much time is required for the calculation. Accordingly, the applications of the conventional subspace-based direction estimation method with eigendecomposition are limited in the actual situations by the heavy computational load of the eigendecomposition process. Further, if the direction of signals incident on the array is not estimated quickly and accurately, the receiving/transmitting beam of the base station cannot be formed accurately, and then the performance of the receiving and transmitting system of the base station will degrade.

SUMMARY OF THE INVENTION

The purpose of this invention is to provide a technique in which the directions of the uncorrelated or correlated signals impinging on the uniform linear array (ULA) can be accurately estimated in a computationally efficient way without eigendecomposition, even when the length of received array data is short or when the signal-to-noise ratio (SNR) is low.

A direction estimation method according to this invention comprises a step of estimating the cross-correlations between the data of some array elements, a step of forming one correlation matrix from the estimated cross-correlations, a step of estimating a noise subspace from the correlation matrix by a linear operation, and a step of calculating a peak position of the spatial spectrum obtained from the noise subspace or a root of a polynomial which is equivalent to the peak position to obtain the directions of incident signals.

According to this invention, the correlation matrix utilizes only the cross-correlation between some antenna elements, so that the evaluation of all antenna elements is not required. Further, the eigenvalue decomposition is not performed so that the computational load is reduced. Therefore this invention can provide a feasible scheme to track the time-varying directions in on-line manner.

BRIEF DESCRIPTION OF DRAWINGS

FIG. 2 to FIG. 5 respectively explain aspects of embodiments of the present invention;

FIG. 10 shows RMSE of each of the estimates $\hat{\theta}_1$ and $\hat{\theta}_2$ in terms of the number of snapshots (i.e., the length of array data) (averaged by 1000 independent trails)

DESCRIPTION OF THE PREFERRED EMBODIMENTS

The present invention provides a technique in which the directions of the fully correlated (i.e., coherent) signals (i.e. multipath waves) or uncorrelated signals impinging on the uniform linear array (ULA) can be accurately estimated in a computationally efficient way without eigendecomposition, even when the length of received array data is short or when the signal-to-noise ratio (SNR) is low in the presence of temporally and spatially uncorrelated white Gaussian noise or of spatially correlated noise.

FIG. 2 to FIG. 5 respectively explain aspects of embodiments of the present invention.

Figure 2:
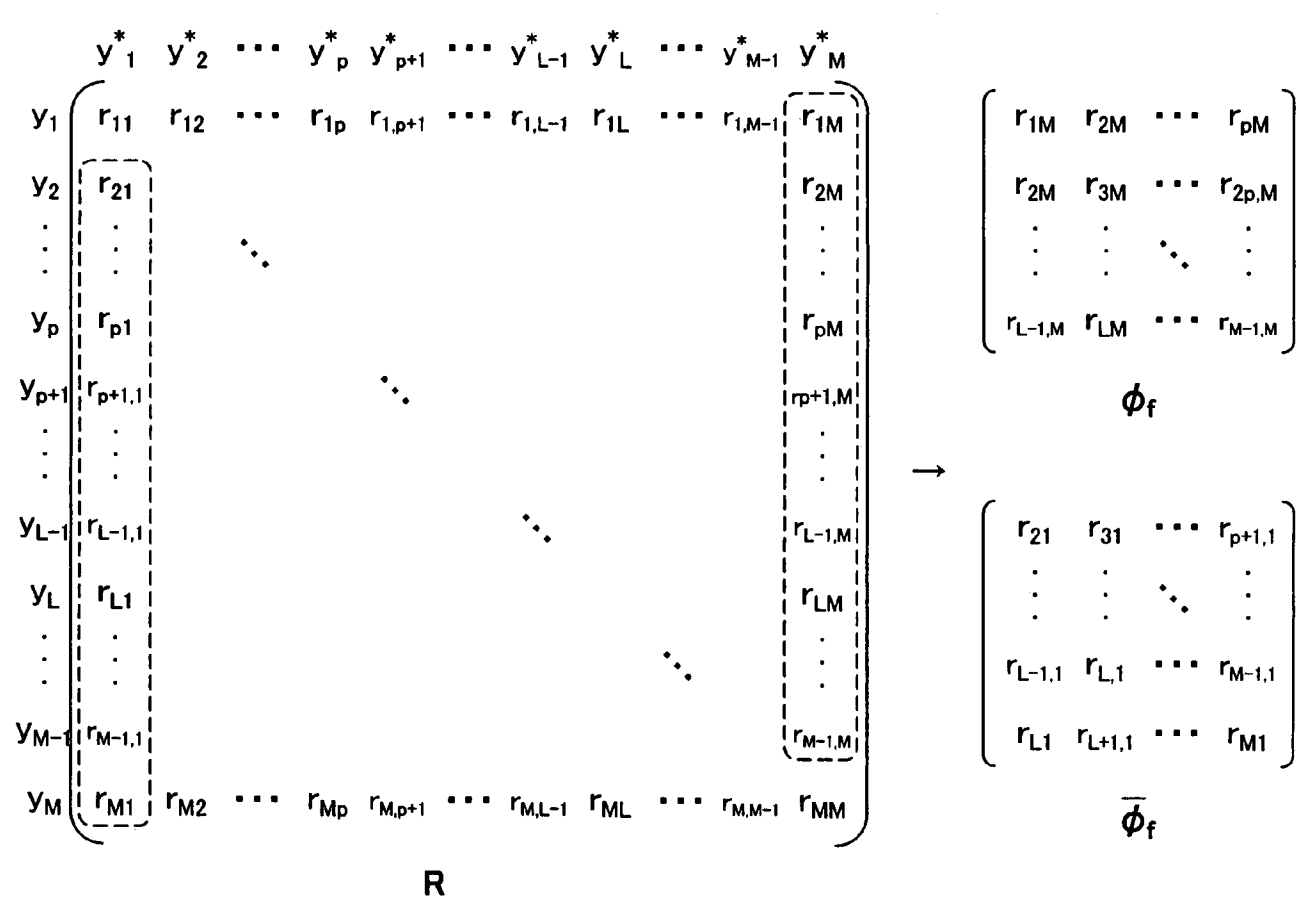

In order to realize the above object, in an aspect of embodiments of the present invention, as shown in FIG. 2, the cross-correlations $\{r_{1M}, r_{2M}, \ldots, r_{M-1,M}\}$ between $M^{th}$ element data and $1^{st}, 2^{nd}, \ldots, M-1^{th}$ elements data are calculated from the received complex digital array data, a Hankel correlation matrix $\Phi_f$ is formed from the above cross-correlations, and a noise subspace is estimated from the above correlation matrix by a liner operation. Thereafter, the direction of each of the multipath waves is estimated from the position of p highest peaks of the spatial spectrum obtained from the above noise subspace or the p roots of a polynomial closet to the unit circle in the z-plane obtained by the above noise subspace.

Also, in another aspect of the embodiments of the present invention, as shown in FIG. 2, the cross-correlations $\{r_{21}, r_{31}, \ldots, r_{M1}\}$ between first element data and $2^{nd}, 3^{rd}, \ldots, M^{th}$ elements data are calculated from the received complex digital array data, and a Hankel correlation matrix $\overline{\Phi}_f$ is formed from the above cross-correlations. Thereafter, the direction of each of the multipath waves is estimated from the position of p highest peaks of the spatial spectrum obtained from the above noise subspace or the p roots of a polynomial closet to the unit circle in the z-plane obtained by the above noise subspace.

Figure 1:
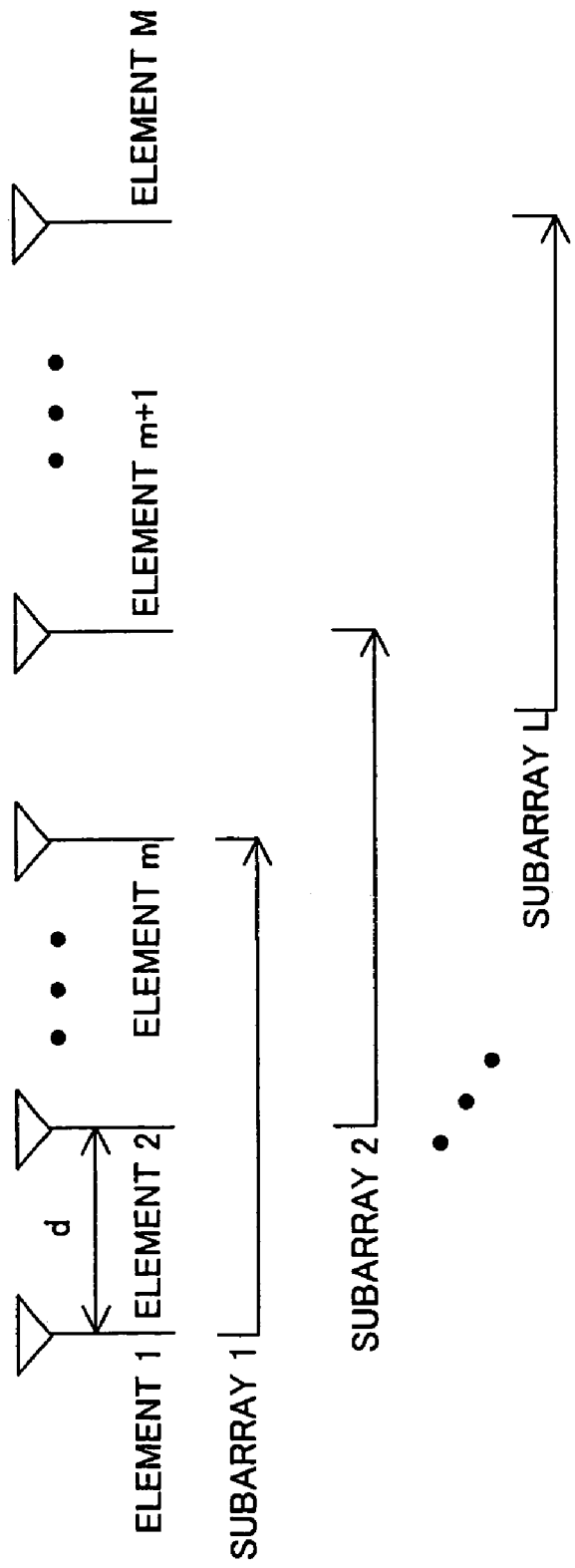
FIG. 1 explains dividing of a uniform linear array into subarrays.
Figure 3:
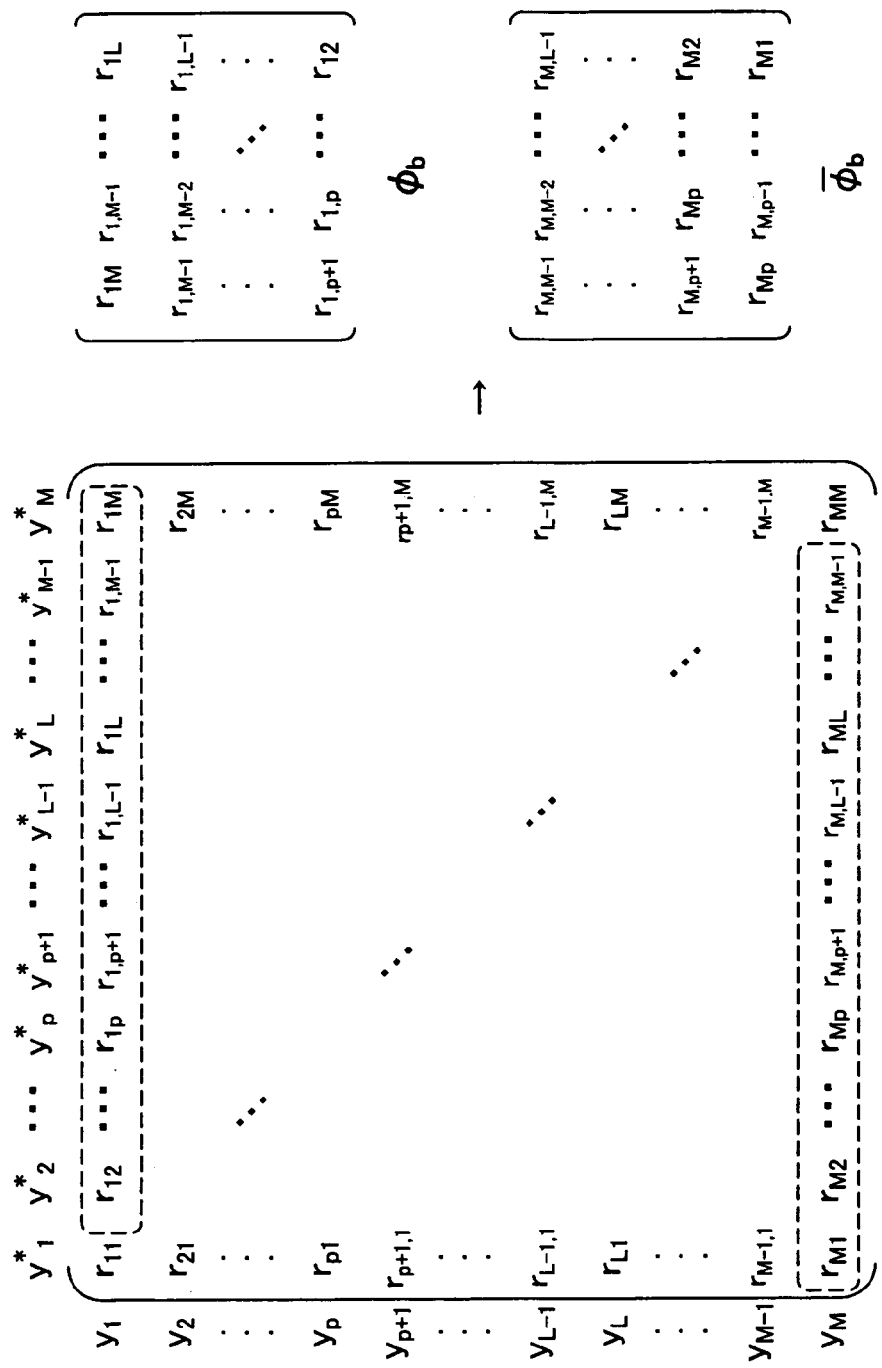

Also, in yet another aspect of the embodiments of the present invention, as shown in FIG. 3, the cross-correlations $\{r_{12}, r_{13}, \ldots, r_{1M}\}$ between first element data and $2^{nd}, 3^{rd}, \ldots, M^{th}$ elements data are calculated from the received complex digital array data, and a Hankel correlation matrix $\Phi_b$ is formed from the above cross-correlations. Thereafter, the direction of each of the multipath waves is estimated from the position of p highest peaks of the spatial spectrum obtained from the above noise subspace or the p roots of a polynomial closet to the unit circle in the z-plane obtained by the above noise subspace.

Also, in still another aspect of the embodiments of the present invention, as shown in FIG. 3, the cross-correlations $\{r_{M1}, r_{M2}, \ldots, r_{M,M-1}\}$ 56 between $M^{th}$ element data and $1^{st}, 2^{nd}, \ldots, M-1^{th}$ elements data are calculated from the received complex digital array data, a Hankel correlation matrix $\overline{\Phi}_f$ is formed from the above correlations, and a noise subspace is calculated from the above correlation matrix by a linear operation. Thereafter, the direction of each of the multipath waves is estimated from the position of p highest peaks of the spatial spectrum obtained from the above noise subspace or the p roots of a polynomial closet to the unit circle in the z-plane obtained by the above noise subspace.

Also, in still another aspect of the embodiments of the present invention, as shown in FIG. 2 and FIG. 3, the cross-correlations between first element data and $2^{nd}, 3^{rd}, \ldots, M^{th}$ elements data, and the cross-correlations between $M^{th}$ element data and $1^{st}, 2^{nd}, \ldots, M-1^{th}$ elements data are calculated from the received complex digital array data, a correlation matrix $\Phi$ (e.g. $\Phi=[\Phi_f, \overline{\Phi}_f, \Phi_b, \overline{\Phi}_b]$) is formed from the obtained Hankel correlation matrixes of, $\Phi_f, \overline{\Phi}_f, \Phi_b, \overline{\Phi}_b$, and a noise subspace is calculated from the above correlation matrix by a liner operation. Thereafter, the direction of each of the multipath waves is estimated from the position of p highest peaks of the spatial spectrum obtained from the above noise subspace or the p roots of a polynomial closet to the unit circle in the z-plane obtained by the above noise subspace.

Also, in still another aspect of the embodiments of the present invention, as shown in FIG. 2 and FIG. 3, the cross-correlations between first element data and $2^{nd}, 3^{nd}, \ldots, M^{th}$ elements data, and the cross-correlations between $M^{th}$ element data and $1^{st}, 2^{nd}, \ldots, M-1^{th}$ elements data are calculated from the received complex digital array data, a correlation matrix $\Phi$ (e.g. $\Phi=[\Phi_f, \overline{\Phi}_f, \Phi_b]$) is formed from three arbitrary matrixes of the obtained Hankel correlation matrixes $\Phi_f, \overline{\Phi}_f, \Phi_b, \overline{\Phi}_b$, and a noise subspace is calculated from the above correlation matrix by a linear operation. Thereafter, the direction of each of the multipath waves is estimated from the position of p highest peaks of the spatial spectrum obtained from the above noise subspace or the p roots of a polynomial closet to the unit circle in the z-plane obtained by the above noise subspace.

Also, in still another aspect of the embodiments of the present invention, as shown in FIG. 2 and FIG. 3, the cross-correlations between first element data and $2^{nd}, 3^{rd}, \ldots, M^{th}$ elements data, and the cross-correlations between $M^{th}$ element data and $1^{st}, 2^{nd}, \ldots, M-1^{th}$ elements data are calculated from the received complex digital array data, a correlation matrix $\Phi$ (e.g. $\Phi=[\Phi_f, \overline{\Phi}_f]$) is formed from two arbitrary matrixes of the obtained Hankel correlation matrixes $\Phi_f, \overline{\Phi}_f, \Phi_b, \overline{\Phi}_b$, and a noise subspace is calculated from the above correlation matrix by a linear operation. Thereafter, the direction of each of the multipath waves is estimated from the position of p highest peaks of the spatial spectrum obtained from the above noise subspace or the p roots of a polynomial closet to the unit circle in the z-plane obtained by the above noise subspace.

Further, by using a technique for estimating the directions of coherent signals in an aspect of the embodiments of the present invention, the direction estimation of uncorrelated signals in the presence of temporally and spatially uncorrelated white noise can be obtained.

Further, by using a technique for estimating the directions of coherent signals in an aspect of the embodiments of the present invention, the direction estimation of the partially correlated signals in the presence of temporally and spatially uncorrelated white noise can be obtained.

Figure 4:
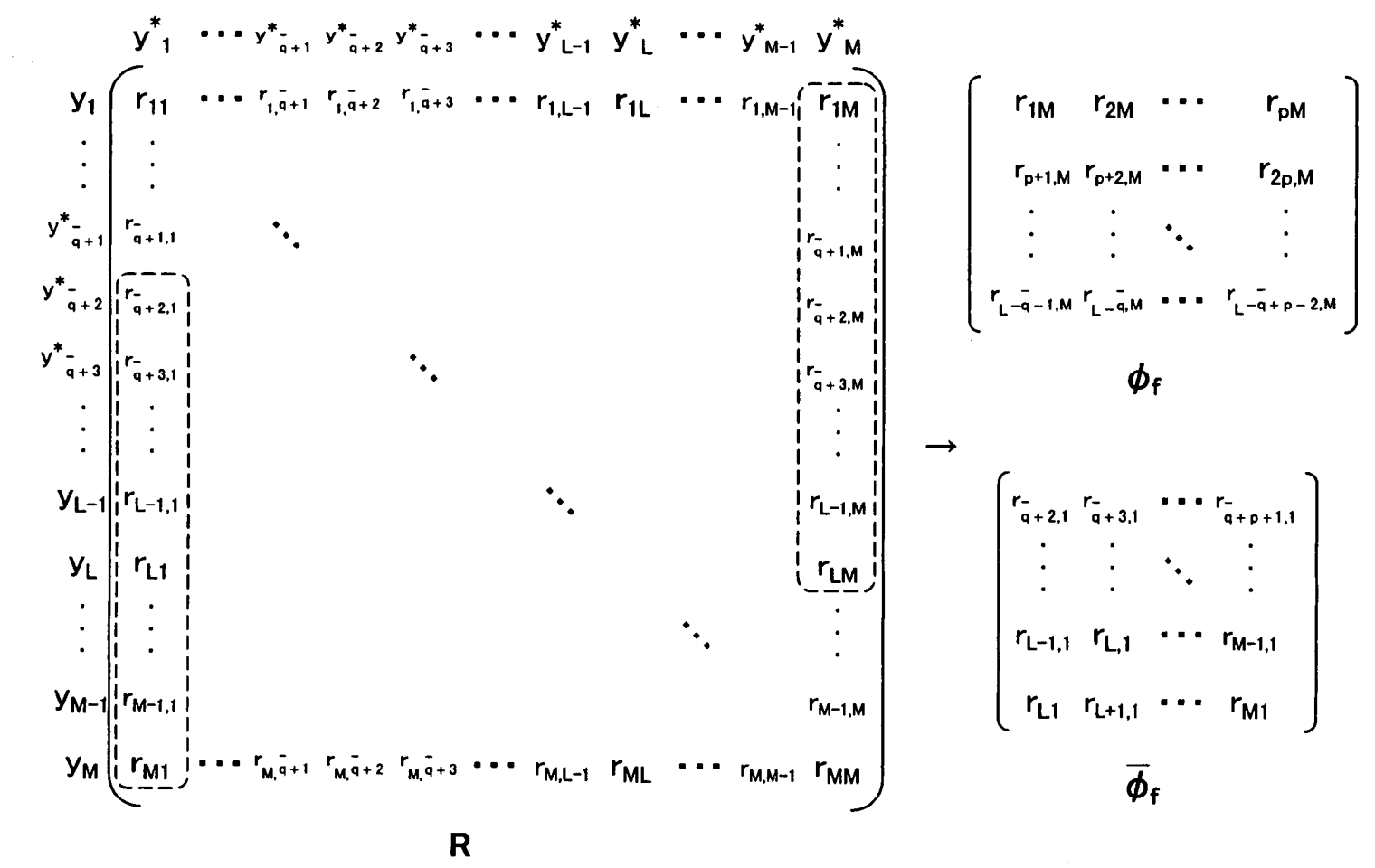
Figure 5:
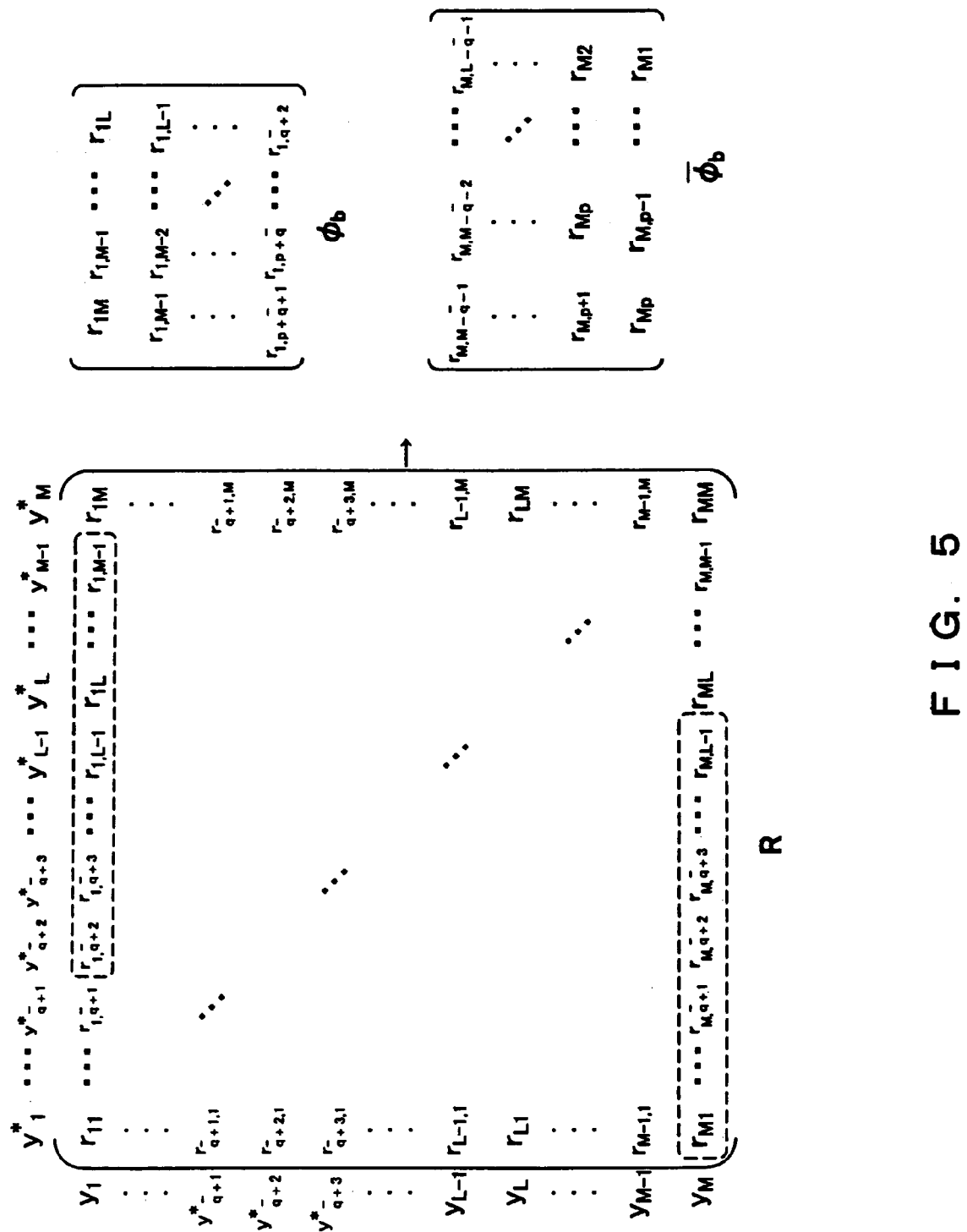

Also, in still another aspect of the embodiments of the present invention, as shown in FIG. 4 and FIG. 5, the cross-correlations between first element data and $\bar{q}+2^{th}$, $\bar{q}+3^{th}$, ..., $M^{th}$ elements data, and the cross-correlations between $M^{th}$ element data and $1^{st}$, $2^{nd}$, ..., $M-1-\bar{q}^{th}$ elements data are calculated from the received complex digital array data, a correlation matrix $\Phi$ (e.g. $\Phi=\Phi_f$) is formed from one arbitrary matrix of the Hankel correlation matrixes $\Phi_f, \overline{\Phi}_f, \Phi_b, \overline{\Phi}_b$ obtained from the above correlations, and a noise subspace is calculated from the above correlation matrix by a linear operation. Thereafter, the direction of each of uncorrelated or partially correlated or coherent signals in the presence of spatially correlated noise is estimated from the position of p highest peaks of the spatial spectrum obtained from the above noise subspace or the p roots of a polynomial closet to the unit circle in the z-plane obtained by the above noise subspace.

Also, in still another aspect of the embodiments of the present invention, as shown in FIG. 4 and FIG. 5, the cross-correlations between first element data and $\bar{q}+2^{th}$, $\bar{q}+3^{th}$, ..., $M^{th}$ elements data, and the cross-correlations between $M^{th}$ element data and $1^{st}$, $2^{nd}$, ..., $M-1-\bar{q}^{th}$ elements data are calculated from the received complex digital array data, a correlation matrix $\Phi$ (e.g. $\Phi=[\Phi_f, \overline{\Phi}_f]$) is formed from two arbitrary matrixes of the Hankel correlation matrixes $\Phi_f, \overline{\Phi}_f, \Phi_b, \overline{\Phi}_b$ obtained from the above correlations, and a noise subspace is calculated from the above correlation matrix by a linear operation. Thereafter, the direction of each of uncorrelated or partially correlated or coherent signals in the presence of spatially correlated noise is estimated from the position of p highest peaks of the spatial spectrum obtained from the above noise subspace or the p roots of a polynomial closet to the unit circle in the z-plane obtained by the above noise subspace.

Also, in still another aspect of the embodiments of the present invention, as shown in FIG. 4 and FIG. 5, the cross-correlations between first element data and $\bar{q}+2^{th}$, $\bar{q}+3^{th}$, ..., $M^{th}$ elements data, and the cross-correlations between $M^{th}$ element data and $1^{st}$, $2^{nd}$, ..., $M-1-\bar{q}^{th}$ elements data are calculated from the received complex digital array data, a correlation matrix $\Phi$ (e.g. $\Phi=[\Phi_f, \overline{\Phi}_f, \Phi_b]$) is formed from three arbitrary matrixes of the Hankel correlation matrixes $\Phi_f, \overline{\Phi}_f, \Phi_b, \overline{\Phi}_b$ obtained from the above correlations, and a noise subspace is calculated from the above correlation matrix by a linear operation. Thereafter, the direction of each of uncorrelated or partially correlated or coherent signals in the presence of spatially correlated noise is estimated from the position of p highest peaks of the spatial spectrum obtained from the above noise subspace or the p roots of a polynomial closet to the unit circle in the z-plane obtained by the above noise subspace.

Also, in still another aspect of the embodiments of the present invention, as shown in FIG. 4 and FIG. 5, the cross-correlations between first element data and $\bar{q}+2^{th}$, $\bar{q}+3^{th}$, ..., $M^{th}$ elements data, and the cross-correlations between $M^{th}$ element data and $1^{st}$, $2^{nd}$, ..., $M-1-\bar{q}^{th}$ elements data are calculated from the cross-complex digital array data, a correlation matrix $\Phi=[\Phi_f, \overline{\Phi}_f, \Phi_b, \overline{\Phi}_b]$ is formed from the Hankel correlation matrixes $\Phi_f, \overline{\Phi}_f, \Phi_b, \overline{\Phi}_b$ obtained from the above correlations, and a noise subspace is calculated from the above correlation matrix by a linear operation. Thereafter, the direction of each of uncorrelated or partially correlated or coherent signals in the presence of spatially correlated noise is estimated from the position of p highest peaks of the spatial spectrum obtained from the above noise subspace or the p roots of a polynomial closet to the unit circle in the z-plane obtained by the above noise subspace.

Also, the technique for estimating the direction of a signal in an aspect of embodiments of the present invention is applied to a direction estimating device of a base station.

Also, the technique for estimating the direction of a signal in an aspect of embodiments of the present invention is applied to a base station, and a device for forming a transmitting beam which generates a beam whose peak is directed at an obtained direction of a signal is provided in the base station.

The present invention relates to a device for the direction estimation of a radio wave impinging on a base station with high estimation accuracy and to a receiving/transmitting device for beamforming at a base station which varies the directivity of a beam of an antenna based on the estimated directions obtained by the direction estimation device.

Hereinafter, by referring to the drawings, the direction estimation device for a base station will be explained as embodiments of the present invention, where the similar things or functions are denoted by the same characters. Also, for simplicity, the explanation is given for one of the previously described embodiments.

Figure 6:
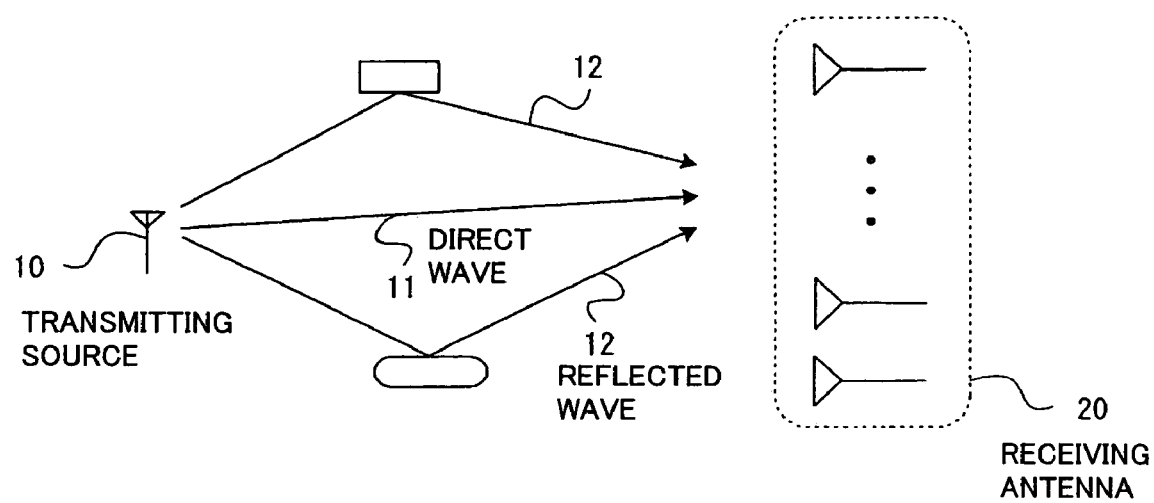
FIG. 6 shows an arrangement of a transmitting source and a receiving antenna 20 in a base station.
Figure 7:
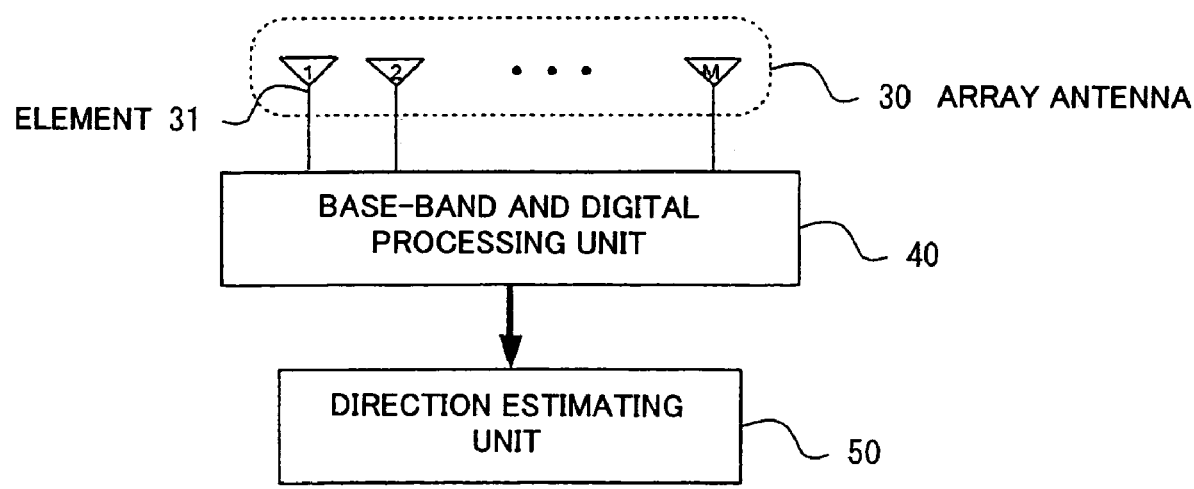
FIG. 7 is a block diagram for showing the direction estimation system realized by applying embodiments of the present invention to the receiving antenna 20 in the base station.

FIG. 6 shows an arrangement of a transmitting source and a receiving antenna 20 at a base station. FIG. 7 is a block diagram showing a direction estimating system realized by applying the embodiment of the present invention to the receiving antenna 20 at the base station.

At the receiving antenna 20 of the base station, the direction estimating system including an direction estimating unit 50 shown in FIG. 7 is arranged. Here, a signal which impinges directly on the antenna 20 at the base station from the transmitting source 10 is a direct wave 11. Also, the signals which impinge on the receiving antenna 20 at the base station after being reflected by buildings are reflected waves 12. In FIG. 6, as an example, two reflected waves are shown, however, hereinafter, the total number of the direct wave and the reflected waves is p. Also, it is assumed that p is known. Further, the relationship between the direct wave and the reflected wave is expressed by the equation below, $$s_k(n)=\beta_k s_1(n)$$

where $\beta_k$ is a multipath coefficient expressing a complex attenuation of the reflected wave $s_k(n)$ regarding the direct wave $s_1(n)$, and $\beta_k \neq 0$ and $\beta_1=1$.

The direction estimating system comprises an array antenna 30, a base-band and digital processing unit 40, and the direction estimating unit 50. Also, the array antenna 30 comprises M antenna elements 31 (where M>2p)

Figure 8:
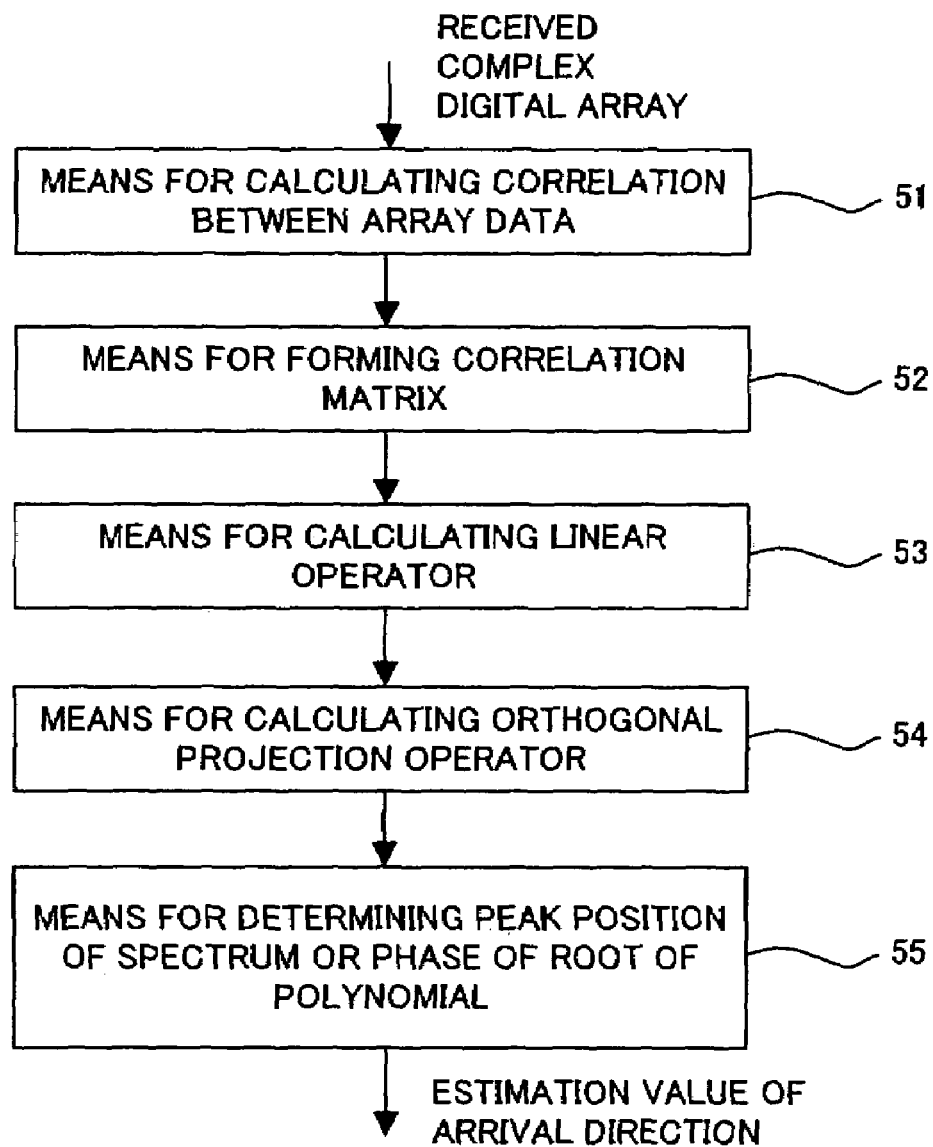
FIG. 8 explains a process to be executed by an direction estimation unit 50.

FIG. 8 explains a process to be executed by the direction estimating unit 50.

The direction estimating unit 50 comprises the means for calculating correlation between array data 51, the means for forming a correlation matrix 52, the means for calculating a linear operator 53, the means for calculating an orthogonal projection operator 54 and the means for determining the peak position of spectrum or the phase of roots of a polynomial 55.

Hereinafter, the technique for estimating the directions of coherent (i.e., fully correlated) signals (i.e., multipath waves) in the direction estimating unit 50 will be explained by referring to FIG. 8. Firstly, the means for calculating correlation between array data 51 forms a signal vector y(n) by using the complex digital signals $y_1(n), y_2(n), \ldots, y_M(n)$ obtained from the base-band and digital processing unit 40 as expressed by equation 1. Then a vector $\hat{\varphi}$ of the correlation between the signal y(n) and $y^{\star}{}_M(n)$, and a vector $\hat{\Phi}$ of the correlation between y(n) and $y^{\star}{}_l(n)$ are obtained by equation 11 by using the received array data $\{y(n)\}_{n=1}^{N}$ for sample times n=1, 2, . . . , N.

$$\hat{\varphi} = [\hat{r}_{1M}, \hat{r}_{2M}, \ldots, \hat{r}_{MM}]^T = \frac{1}{N}\sum_{n=1}^{N} y(n) y_M^*(n)$$

$$\hat{\bar{\varphi}} = [\hat{r}_{11}, \hat{r}_{21}, \ldots, \hat{r}_{M1}]^T = \frac{1}{N}\sum_{n=1}^{N} y(n) y_1^*(n)$$

[Equation 11]

Next, the means for forming correlation matrix 52 forms the estimated (L−1)×p Hankel correlation matrices $\hat{\Phi}_f$, $\hat{\bar{\Phi}}_f$, $\hat{\Phi}_b$, $\hat{\bar{\Phi}}_b$ as shown in FIG. 2 and FIG. 3 by using the correlations obtained by equation 11, $$\hat{\Phi}_f \equiv \begin{bmatrix} \hat{r}_{1M} & \hat{r}_{2M} & \cdots & \hat{r}_{pM} \\ \hat{r}_{2M} & \hat{r}_{3M} & \cdots & \hat{r}_{p+1M} \\ \vdots & \vdots & \ddots & \vdots \\ \hat{r}_{L-1M} & \hat{r}_{LM} & \cdots & \hat{r}_{M-1M} \end{bmatrix}, \hat{\bar{\Phi}}_f \equiv \begin{bmatrix} \hat{r}_{21} & \hat{r}_{31} & \cdots & \hat{r}_{p+1,1} \\ \hat{r}_{31} & \hat{r}_{41} & \cdots & \hat{r}_{p+2,1} \\ \vdots & \vdots & \ddots & \vdots \\ \hat{r}_{L1} & \hat{r}_{L+1,L} & \cdots & \hat{r}_{M1} \end{bmatrix}$$

$$\hat{\Phi}_b \equiv \begin{bmatrix} \hat{r}_{1M} & \hat{r}_{1,M-1} & \cdots & \hat{r}_{1L} \\ \hat{r}_{1,M-1} & \hat{r}_{1,M-2} & \cdots & \hat{r}_{1,L-1} \\ \vdots & \vdots & \ddots & \vdots \\ \hat{r}_{1,p+1} & \hat{r}_{1p} & \cdots & \hat{r}_{12} \end{bmatrix}, \hat{\bar{\Phi}}_b \equiv \begin{bmatrix} \hat{r}_{M,M-1} & \hat{r}_{M,M-2} & \cdots & \hat{r}_{M,L-1} \\ \hat{r}_{M,M-2} & \hat{r}_{M,M-3} & \cdots & \hat{r}_{M,L-2} \\ \vdots & \vdots & \ddots & \vdots \\ \hat{r}_{Mp} & \hat{r}_{M,p-1} & \cdots & \hat{r}_{M1} \end{bmatrix}$$

[Equation 12]

where L=M−p+1. It is known from equation 2 that the Hankel correlation matrixes $\hat{\Phi}_f$, $\hat{\bar{\Phi}}_f$, $\hat{\Phi}_b$, $\hat{\bar{\Phi}}_b$ are not affected by the additive noise when the length of data N is sufficiently large. Also, it is found that $\Phi_b = J_{L-1} \bar{\Phi}_f^* J_p$ and $\bar{\Phi}_b = J_{L-1} \Phi_f^* J_p$ where $J_m$ is m×m reflection matrix. Further, a (L−1)×4p correlation matrix $\hat{\Phi} \equiv [\hat{\Phi}_f, \hat{\bar{\Phi}}_f, \hat{\Phi}_b, \hat{\bar{\Phi}}_b]$ is formed.

Next, the means for calculating a linear operator 53 divides the correlation matrix $\hat{\Phi}$ into two parts as below, $$\hat{\Phi} \equiv \begin{bmatrix} \hat{\Phi}_1 \\ \hat{\Phi}_2 \end{bmatrix} \begin{matrix} \}p \\ \}L-p-1 \end{matrix}$$

[Equation 13]

where the p×4p correlation matrix $\Phi_1$ and the (L−p−1)×4p correlation matrix $\Phi_2$ are given as $\Phi_1 \equiv [\Phi_{f1}, \bar{\Phi}_{f1}, \Phi_{b1}, \bar{\Phi}_{b1}]$ and $\Phi_2 \equiv [\Phi_{f2}, \bar{\Phi}_{f2}, \Phi_{b2}, \bar{\Phi}_{b2}]$, respectively. Also, a linear operator P is obtained by equation 14

$$\hat{P} = (\hat{\Phi}_1 \hat{\Phi}_1^H)^{-1} \hat{\Phi}_1 \hat{\Phi}_2^H$$

[Equation 14]

Next, the means for calculating orthogonal projection operator 54 obtains an orthogonal projection operator $\Pi_{\hat{Q}}$ by equation 15

$$\Pi_{\hat{Q}} = \hat{Q}(I_{L-p-1} - \hat{P}^H(\hat{P}\hat{P}^H + I_p)\hat{P})^{-1}\hat{Q}^H$$

[Equation 15]

Finally, the means for determining peak positions of the spectrum or the phase of roots of a polynomial 55 calculates the directions of the multipath waves from the positions of p highest peaks of the spectrum P(θ) in equation 16 or from the phase of p roots of the polynomial p(z) which is the closest to a unit circle in the z-plane as shown in equation 17, then the estimation results $\{\hat{\theta}_k\}$ are output, $$P(\theta) \equiv \frac{1}{\bar{a}^H(\theta) \Pi_{\hat{Q}} \bar{a}(\theta)}$$

[Equation 16]

$$p(z) \equiv z^{L-2} p^H(z) \Pi_{\hat{Q}} p(z)$$

[Equation 17]

where $\bar{a}(\theta) \equiv [1, e^{j\omega_0 r(\theta)}, \ldots, e^{j\omega_0(L-2)r(\theta)}]^T$, $p(z) \equiv [1, z, \ldots, z^{L-2}]^T$ and $z \equiv e^{j\omega_0 r(\theta)}$.

As above, the direction estimating unit 50 can estimate the direction of each of the multipath waves. Hereinafter, a more detailed explanation will be given for an example of simulations. Here, it is assumed that the number of antenna elements M is 10. Also, two multipath waves having the same power (p=2) are incident on the array antenna respectively with angles $\theta_1 = 5°$ and $\theta_2 = 12°$.

Firstly, the estimation performance of the direction of each of the multipath waves based on an embodiment of the present invention with respect to the signal-to-noise ratio (SNR) is discussed. Here assuming that the length of the received data N (i.e., the number of snapshots) is 128, the SNR is varied within a range between −10 dB and 25 dB. 1000 independent trials are carried out for each value of SNR.

Figure 9:
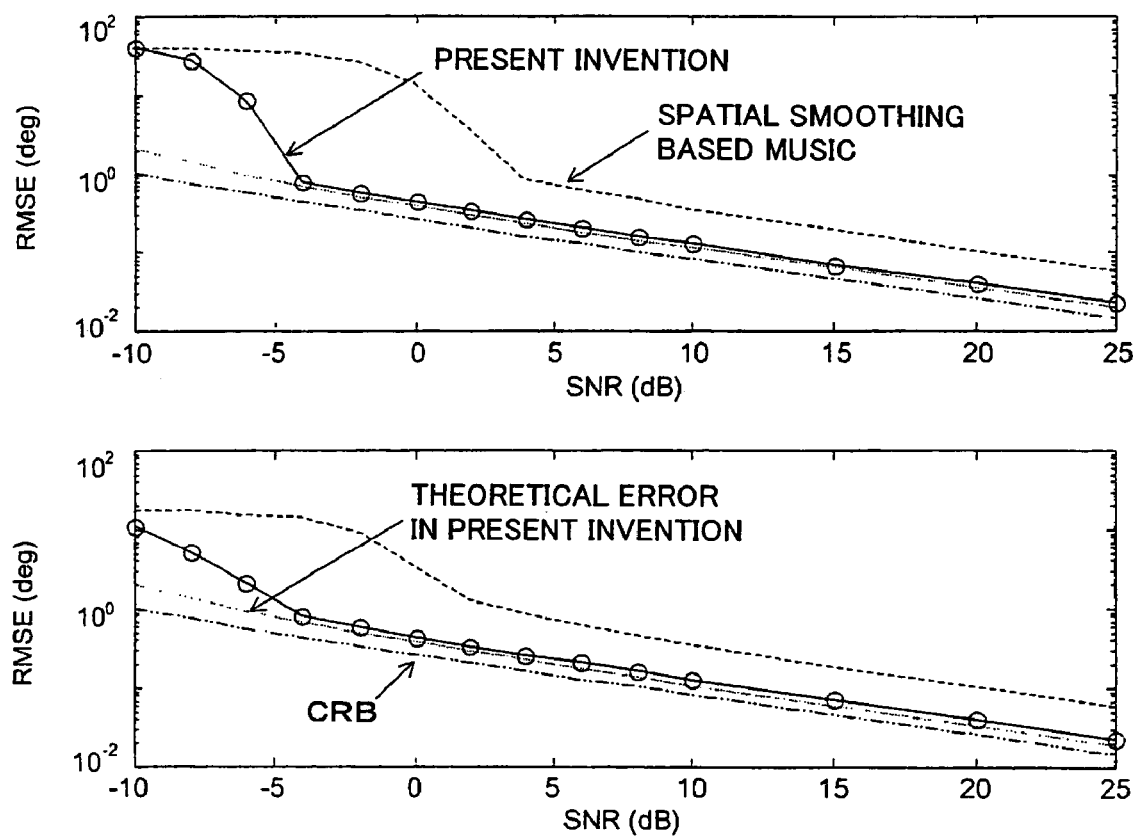
FIG. 9 shows RMSE (root mean-squared-errors) of estimated values $\hat{\theta}_1$ and $\hat{\theta}_2$ of the signal directions in terms of the signal-to-noise ratio (SNR) (averaged by 1000 independent trails)

FIG. 9 shows the RMSE (root mean-squared-error) of estimates $\hat{\theta}_1$ and $\hat{\theta}_2$ of the directions. For comparison, the theoretical error of the estimated direction based on the present invention, the CRB (Cramer-Rao lower bound) which indicates the ideally minimum error of the direction estimation and the results of the conventional spatial smoothing based MUSIC (m=7) are plotted.

As it is shown in FIG. 9, by using the direction estimation technique based on the present invention, the influence of additive noise is removed by suitably selecting the correlation $\hat{r}_{ik}$ of array data which constitutes the correlation matrix $\Phi_f$, $\bar{\Phi}_f$, $\Phi_b$, $\bar{\Phi}_b$ so that the estimation performance of the present invention is much better than that of the spatial smoothing based MUSIC with eigenvalue decomposition. Also, there is only a very slight difference between the theoretical error in the technique of the present invention and the CRB. Further, the computational complexity of the technique of the present invention is greatly reduced to 1/7.147 of that of the spatial smoothing based MUSIC.

Next, the estimation performance of the direction of each of the multipath waves based on the present invention with respect to the length of the received data (i.e., the number of snapshots) is examined. Here assuming that the SNR is 10 dB, the length of the received data N (the number of snapshots) is varied within a range between 10 and 1000.

FIG. 10 shows the RMSE of each of the estimates $\hat{\theta}$ and $\hat{\theta}_2$ obtained from 1000 independent trials. As shown in FIG. 10, the estimation error expressed as RMSE according to the technique for the present invention is very close to the ideal minimum error shown as the CRB when the length of data is large. However, even when the length of the received data is short, the technique according to the present invention provides an estimation of the directions more accurately than the conventional spatial smoothing based MUSIC.

In the above example, an aspect of the method for estimating the direction of each of the multipath waves has been explained, where the estimated correlated matrix $\hat{\Phi}$ is formed by $\hat{\Phi} \equiv [\hat{\Phi}_f, \hat{\bar{\Phi}}_f, \hat{\Phi}_b, \hat{\bar{\Phi}}_b]$. However, when the estimated correlation matrix $\hat{\Phi}$ is defined by a combination of the correlation matrices $\hat{\Phi}_f, \hat{\bar{\Phi}}_f, \hat{\Phi}_b, \hat{\bar{\Phi}}_b$, the method for estimating an direction of each of the multipath waves (i.e., coherent (fully correlated) signals), the partially correlated signals or the uncorrelated signals in the presence of temporally and spatially uncorrelated white noise can be easily realized.

Further, when it is assumed that the length of the spatial correlation of noise is $\bar{q}$ in a spatially correlated noise environment (i.e. $E\{w_i(n)w_{i+k}*(n)\}=0$ in the case of $|k|>\bar{q}$), the $(L-\bar{q}-1)\times p$ Hankel correlation matrixes $\hat{\Phi}_f, \hat{\bar{\Phi}}_f, \hat{\Phi}_b, \hat{\bar{\Phi}}_b$ can be formed from the estimates $\hat{r}_{ik}$ of the correlation of array data as shown in and expressed by FIG. 4, FIG. 5 and equation 8, instead of the $(L-1)\times p$ Hankel correlation matrixes $\hat{\Phi}_f, \hat{\bar{\Phi}}_f, \hat{\Phi}_b, \hat{\bar{\Phi}}_b$ in equation 12. Here, it is assumed that $M>2p+\bar{q}$.

$$\hat{\Phi}_f \equiv \begin{bmatrix} \hat{r}_{1M} & \hat{r}_{2M} & \cdots & \hat{r}_{pM} \\ \hat{r}_{2M} & \hat{r}_{3M} & \cdots & \hat{r}_{p+1M} \\ \vdots & \vdots & \ddots & \vdots \\ \hat{r}_{L-\bar{q}-1M} & \hat{r}_{L-\bar{q}M} & \cdots & \hat{r}_{M-\bar{q}-1M} \end{bmatrix}, \hat{\bar{\Phi}}_f \equiv \begin{bmatrix} \hat{r}_{\bar{q}+2,1} & \hat{r}_{\bar{q}+3,1} & \cdots & \hat{r}_{\bar{q}+p+1,1} \\ \hat{r}_{\bar{q}+3,1} & \hat{r}_{\bar{q}+4,1} & \cdots & \hat{r}_{\bar{q}+p+2,1} \\ \vdots & \vdots & \ddots & \vdots \\ \hat{r}_{LI} & \hat{r}_{L+1,L} & \cdots & \hat{r}_{MI} \end{bmatrix}$$

$$\hat{\Phi}_b \equiv \begin{bmatrix} \hat{r}_{1M} & \hat{r}_{1,M-1} & \cdots & \hat{r}_{1L} \\ \hat{r}_{1,M-1} & \hat{r}_{1,M-2} & \cdots & \hat{r}_{1,L-1} \\ \vdots & \vdots & \ddots & \vdots \\ \hat{r}_{1,\bar{q}+p+1} & \hat{r}_{1,\bar{q}+p} & \cdots & \hat{r}_{1,\bar{q}+2} \end{bmatrix}, \hat{\bar{\Phi}}_b \equiv \begin{bmatrix} \hat{r}_{M,M-\bar{q}-1} & \hat{r}_{M,M-\bar{q}-2} & \cdots & \hat{r}_{M,L-\bar{q}-1} \\ \hat{r}_{M,M-\bar{q}-2} & \hat{r}_{M,M-\bar{q}-3} & \cdots & \hat{r}_{M,L-\bar{q}-2} \\ \vdots & \vdots & \ddots & \vdots \\ \hat{r}_{Mp} & \hat{r}_{M,p-1} & \cdots & \hat{r}_{MI} \end{bmatrix}$$

[Equation 18]

Further, the corresponding estimated correlation matrix $\hat{\Phi}$ can be divided into two parts as expressed by equation 19.

$$\hat{\Phi} \equiv \begin{bmatrix} \hat{\Phi}_1 \\ \hat{\Phi}_2 \end{bmatrix} \begin{matrix} \}p \\ \}L-\bar{q}-p-1 \end{matrix}$$

[Equation 19]

A method for estimating the arrival direction of each of the multipath waves (i.e., coherent (fully correlated) signals), partially correlated signals or the uncorrelated signals in the spatially correlated noise environment can be realized by using the concepts of equation 14 to equation 17. Here the reason that the correlation matrix is formed by removing the element closest to the diagonal of the covariance matrix R is that the noise components ride on a part which is close to the diagonal of the covariance matrix R. Therefore, by forming the correlation matrix by removing the elements which is closest to the diagonal of the covariance matrix R, a technique in which the directions are accurately estimated even when the noise component is included can be provided.

Further, by utilizing the direction estimating device which employs the direction estimation technique explained above, a reception beamformer for a base station which forms a beam whose intensity peak is directed in a desired direction can be realized.

Figure 11:
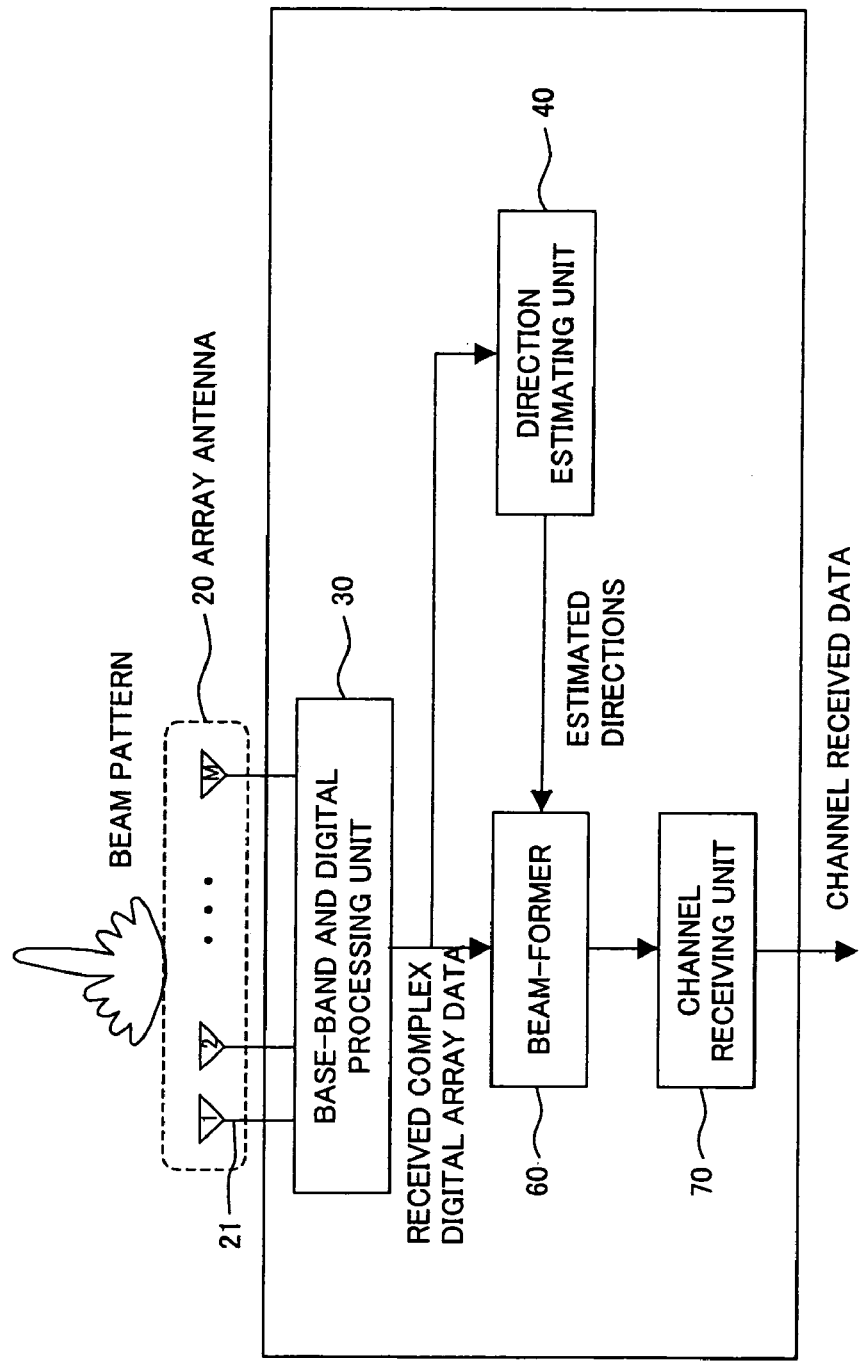
FIG. 11 explains a reception beamformer for a base station which forms a beam whose peak is directed to a desired direction of incident signal realized by utilizing the direction estimating device which employs a direction estimation technique in an embodiment of the present invention.

FIG. 11 explains the reception beamformer for a base station which forms a beam whose intensity peak is directed in a desired direction realized by utilizing the direction estimating device which employs the direction estimation technique in an embodiment of the present invention.

Here, in a configuration of the reception beamformer in the base station 20, a signal is received by the array antenna 20, the received complex digital array data is obtained from the base-band and digital processing unit 30, and a desired beam can be formed by a beamformer 60 which uses an estimated direction obtained from the direction estimating unit 40. The data obtained by extracting a desired signal and by suppressing interference and noise is sent from the beamformer 60 to a channel receiving unit 70, and in the channel receiving unit 70, a receiving process according to the common and conventional method is executed so that the received data is obtained. Further, in the beam former 70, various configurations are possible by utilizing the information regarding the direction obtained by the technique according to the present invention. For example, by utilizing a beamforming technique discussed in "An algorithm for linearly constrained adaptive array processing," by O. L. Frost, Proc. IEEE, vol. 60, no. 8, pp. 926–935 (1975) and "Array beam forming based on cyclic signal detection", by J. Xin, H. Tsuji, Y. Hase, and A. Sano, Proc. IEEE 48th Vehicular Technology Conference, pp. 890–894, Ottawa, Canada (1998) and the others, a beam can be formed to a desired arrival direction of a signal.

The technique can be utilized to control the peak of a reception beam in which the peak of the receiving sensitivity at a base station is directed to the estimated direction, and also can be utilized to control the peak of a transmitting beam so that the intensity peak of the transmitted signal is directed to the estimated direction when the base station transmits a signal.

As explained above, the present invention can estimate the direction-of-arrival (DOA) of the incident signals without utilizing the eigendecomposition with a reduced computational load. As clearly demonstrated in the examples of simulations, the technique according to the present invention provides an accurate estimation of the directions of signals impinging on an array antenna at a base station even when the length of received data is short or when the signal-to-noise ratio (SNR) is low. Also, the technique according to the present invention has a much better estimation performance with a reduced computational load than the conventional spatial smoothing based MUSIC. Accordingly, the accuracy of the direction estimation of the incident signals can be improved. Further, by utilizing information regarding the estimated direction obtained by the method according to the present invention, a receiving/transmitting device for beamforming at a base station which can form a beam having a directivity in a desired direction can be realized.

What is claimed is:

1. A method for estimating directions-of-arrival (DOA) of signals impinging on an antenna array, comprising:
   estimating cross-correlations between some of elements by using received array data obtained by array antenna elements which are linearly arrayed in different spatial positions with uniform element spacings, and forming a correlation matrix from the cross-correlations;
   estimating a noise subspace from the correlation matrix by a linear operation; and
   calculating a peak position of a spatial spectrum obtained from the noise subapace or a root of a polynomial which is equivalent to the peak position, and calculating the directions of incident signals.

2. The method for estimating the directions of incident signals according to claim 1, wherein:
   the correlation matrix is formed from the estimated cross-correlations between $M^{th}$ element data and $1^{st}$, $2^{nd}$, ..., $M-1^{th}$ elements data when it is assumed that M is the number of the antenna elements.

3. The method for estimating the directions of incident signals according to claim 1, wherein:
   the correlation matrix is formed from the estimated cross-correlations between first element data and $2^{nd}$, $3^{rd}$, ..., $M^{th}$ elements data when it is assumed that M is the number of the antenna elements.

4. The method for estimating the directions of incident signals in the presence of temporally and spatially uncorrelated noise according to claim 1, wherein:
   the correlation matrix is formed as the following equation $$\hat{\Phi}_f \equiv \begin{bmatrix} \hat{r}_{1M} & \hat{r}_{2M} & \cdots & \hat{r}_{pM} \\ \hat{r}_{2M} & \hat{r}_{3M} & \cdots & \hat{r}_{p+1,M} \\ \vdots & \vdots & \ddots & \vdots \\ \hat{r}_{L-1,M} & \hat{r}_{LM} & \cdots & \hat{r}_{M-1,M} \end{bmatrix}$$

when it is assumed that $\hat{r}_{ij}$ is the estimated correlation between $i^{th}$ element data and $j^{th}$ element data, M is the number of the antenna elements, p is the number of incident signals (p<M/2), and L=M−p+1.

5. The method for estimating the directions of incident signals in the presence of temporally and spatially uncorrelated noise according to claim 1, wherein:
   the correlation matrix is formed as the following equation $$\hat{\Phi}_b \equiv \begin{bmatrix} \hat{r}_{M,M-1} & \hat{r}_{M,M-2} & \cdots & \hat{r}_{M,L-1} \\ \hat{r}_{M,M-2} & \hat{r}_{M,M-3} & \cdots & \hat{r}_{ML-2} \\ \vdots & \vdots & \ddots & \vdots \\ \hat{r}_{Mp} & \hat{r}_{M,p-1} & \cdots & \hat{r}_{M1} \end{bmatrix}$$

when it is assumed that $\hat{r}_{ij}$ is the estimated correlation between the $i^{th}$ element data and the $j^{th}$ element data, M is the number of the antenna elements, p is the number of incident signals (p<M/2), and L=M−p+1.

6. The method for estimating the directions of incident signals in the presence of temporally and spatially uncorrelated noise according to claim 1, wherein:
   the correlation matrix is formed as the following equation $$\hat{\Phi}_f \equiv \begin{bmatrix} \hat{r}_{21} & \hat{r}_{31} & \cdots & \hat{r}_{p+1,1} \\ \hat{r}_{31} & \hat{r}_{41} & \cdots & \hat{r}_{p+2,1} \\ \vdots & \vdots & \ddots & \vdots \\ \hat{r}_{LI} & \hat{r}_{L+1,1} & \cdots & \hat{r}_{MI} \end{bmatrix}$$

when it is assumed that $\hat{r}_{ij}$ is the estimated correlation between the $i^{th}$ element data and the $j^{th}$ element data, M is the number of the antenna elements, p is the number of incident signals (p<M/2), and L=M−p+1.

7. The method for estimating the directions of incident signals in the presence of temporally and spatially uncorrelated noise according to claim 1, wherein:
   the correlation matrix is formed as the following equation $$\hat{\Phi}_b \equiv \begin{bmatrix} \hat{r}_{1M} & \hat{r}_{1,M-1} & \cdots & \hat{r}_{1L} \\ \hat{r}_{1,M-1} & \hat{r}_{1,M-2} & \cdots & \hat{r}_{1,L-1} \\ \vdots & \vdots & \ddots & \vdots \\ \hat{r}_{1,p+1} & \hat{r}_{1p} & \cdots & \hat{r}_{12} \end{bmatrix}$$

when it is assumed that $\hat{r}_{ij}$ is the estimated correlation between the $i^{th}$ element data and the $j^{th}$ element data, M is the number of the antenna elements, p is the number of incident signals (p<M/2), and L=M−p+1.

8. The method for estimating the direction of incident signals in the presence of temporally and spatially uncorrelated noise according to claim 1, wherein:
   the correlation matrix is formed from two arbitrary matrixes of the following Hankel correlation matrices given by $$\hat{\Phi}_f \equiv \begin{bmatrix} \hat{r}_{1M} & \hat{r}_{2M} & \cdots & \hat{r}_{pM} \\ \hat{r}_{2M} & \hat{r}_{3M} & \cdots & \hat{r}_{p+1,M} \\ \vdots & \vdots & \ddots & \vdots \\ \hat{r}_{L-1,M} & \hat{r}_{LM} & \cdots & \hat{r}_{M-1,M} \end{bmatrix},$$

$$\hat{\Phi}_f \equiv \begin{bmatrix} \hat{r}_{21} & \hat{r}_{31} & \cdots & \hat{r}_{p+1,1} \\ \hat{r}_{31} & \hat{r}_{41} & \cdots & \hat{r}_{p+2,1} \\ \vdots & \vdots & \ddots & \vdots \\ \hat{r}_{LI} & \hat{r}_{L+1,1} & \cdots & \hat{r}_{MI} \end{bmatrix},$$

$$\hat{\Phi}_b \equiv \begin{bmatrix} \hat{r}_{1M} & \hat{r}_{1,M-1} & \cdots & \hat{r}_{1L} \\ \hat{r}_{1,M-1} & \hat{r}_{1,M-2} & \cdots & \hat{r}_{1,L-1} \\ \vdots & \vdots & \ddots & \vdots \\ \hat{r}_{1,p+1} & \hat{r}_{1p} & \cdots & \hat{r}_{12} \end{bmatrix},$$

-continued $$\hat{\Phi}_b \equiv \begin{bmatrix} \hat{r}_{M,M-1} & \hat{r}_{M,M-2} & \cdots & \hat{r}_{M,L-1} \\ \hat{r}_{M,M-2} & \hat{r}_{M,M-3} & \cdots & \hat{r}_{ML-2} \\ \vdots & \vdots & \ddots & \vdots \\ \hat{r}_{Mp} & \hat{r}_{M,p-1} & \cdots & \hat{r}_{MI} \end{bmatrix}$$

when it is assumed that $\hat{r}_{ij}$ is the estimated correlation between the $i^{th}$ element data and the $j^{th}$ element data, M is the number of the antenna elements, p is the number of incident signals (p<M/2), and L=M−p+1.

9. The method for estimating the directions of incident signals in the presence of temporally and spatially uncorrelated noise according to claim 1, wherein:

the correlation matrix is formed from three arbitrary matrixes of the following Hankel correlation matrices given by $$\hat{\Phi}_f \equiv \begin{bmatrix} \hat{r}_{1M} & \hat{r}_{2M} & \cdots & \hat{r}_{pM} \\ \hat{r}_{2M} & \hat{r}_{3M} & \cdots & \hat{r}_{p+1,M} \\ \vdots & \vdots & \ddots & \vdots \\ \hat{r}_{L-1,M} & \hat{r}_{LM} & \cdots & \hat{r}_{M-1,M} \end{bmatrix},$$

$$\hat{\Phi}_f \equiv \begin{bmatrix} \hat{r}_{21} & \hat{r}_{31} & \cdots & \hat{r}_{p+1,1} \\ \hat{r}_{31} & \hat{r}_{41} & \cdots & \hat{r}_{p+2,1} \\ \vdots & \vdots & \ddots & \vdots \\ \hat{r}_{LI} & \hat{r}_{L+1,1} & \cdots & \hat{r}_{MI} \end{bmatrix},$$

$$\hat{\Phi}_b \equiv \begin{bmatrix} \hat{r}_{1M} & \hat{r}_{1,M-1} & \cdots & \hat{r}_{1L} \\ \hat{r}_{1,M-1} & \hat{r}_{1,M-2} & \cdots & \hat{r}_{1,L-1} \\ \vdots & \vdots & \ddots & \vdots \\ \hat{r}_{1,p+1} & \hat{r}_{1p} & \cdots & \hat{r}_{12} \end{bmatrix},$$

$$\hat{\Phi}_b \equiv \begin{bmatrix} \hat{r}_{M,M-1} & \hat{r}_{M,M-2} & \cdots & \hat{r}_{M,L-1} \\ \hat{r}_{M,M-2} & \hat{r}_{M,M-3} & \cdots & \hat{r}_{ML-2} \\ \vdots & \vdots & \ddots & \vdots \\ \hat{r}_{Mp} & \hat{r}_{M,p-1} & \cdots & \hat{r}_{MI} \end{bmatrix}$$

when it is assumed that $\hat{r}_{ij}$ is the estimated correlation between the $i^{th}$ element data and the $j^{th}$ element data, M is the number of the antenna elements, p is the number of incident signals (p<M/2), and L=M−p+1.

10. The method for estimating the directions of incident signals in the presence of temporally and spatially uncorrelated noise according to claim 1, wherein:

the correlation matrix is formed by a combination of the following four Hankel correlation matrices given by $$\hat{\Phi}_f \equiv \begin{bmatrix} \hat{r}_{1M} & \hat{r}_{2M} & \cdots & \hat{r}_{pM} \\ \hat{r}_{2M} & \hat{r}_{3M} & \cdots & \hat{r}_{p+1,M} \\ \vdots & \vdots & \ddots & \vdots \\ \hat{r}_{L-1,M} & \hat{r}_{LM} & \cdots & \hat{r}_{M-1,M} \end{bmatrix},$$

$$\hat{\Phi}_f \equiv \begin{bmatrix} \hat{r}_{21} & \hat{r}_{31} & \cdots & \hat{r}_{p+1,1} \\ \hat{r}_{31} & \hat{r}_{41} & \cdots & \hat{r}_{p+2,1} \\ \vdots & \vdots & \ddots & \vdots \\ \hat{r}_{LI} & \hat{r}_{L+1,1} & \cdots & \hat{r}_{MI} \end{bmatrix},$$

$$\hat{\Phi}_b \equiv \begin{bmatrix} \hat{r}_{1M} & \hat{r}_{1,M-1} & \cdots & \hat{r}_{1L} \\ \hat{r}_{1,M-1} & \hat{r}_{1,M-2} & \cdots & \hat{r}_{1,L-1} \\ \vdots & \vdots & \ddots & \vdots \\ \hat{r}_{1,p+1} & \hat{r}_{1p} & \cdots & \hat{r}_{12} \end{bmatrix},$$

$$\hat{\Phi}_b \equiv \begin{bmatrix} \hat{r}_{M,M-1} & \hat{r}_{M,M-2} & \cdots & \hat{r}_{M,L-1} \\ \hat{r}_{M,M-2} & \hat{r}_{M,M-3} & \cdots & \hat{r}_{ML-2} \\ \vdots & \vdots & \ddots & \vdots \\ \hat{r}_{Mp} & \hat{r}_{M,p-1} & \cdots & \hat{r}_{MI} \end{bmatrix}$$

when it is assumed that $\hat{r}_{ij}$ is the estimated correlation between the $i^{th}$ element data and the $j^{th}$ element data, M is the number of the antenna elements, p is the number of incident signals (p<M/2), and L=M−p+1.

11. The method for estimating the directions of incident signals in the presence of spatially correlated noise according to claim 1, wherein:

the correlation matrix is formed from the cross-correlations between $M^{th}$ element data and $1^{st}, 2^{nd}, \ldots, M-1-\bar{q}^{th}$ elements data, where M is the number of the antenna elements, p is the number of incident signals (M>2p+$\bar{q}$), and $\bar{q}$ is the spatial correlation length of additive noise (0<$\bar{q}$<M−1).

12. The method for estimating the directions of incident signals in the presence of spatially correlated noise according to claim 1, wherein:

the correlation matrix is formed from the cross-correlations between first element data and $\bar{q}+2^{nd}, \bar{q}+3^{rd}, \ldots, M^{th}$ elements data, where M is the number of the antenna elements, p is the number of incident signals (M>2p+$\bar{q}$), and $\bar{q}$ is the spatial correlation length of additive noise (0<$\bar{q}$<M−1).

13. The method for estimating the directions of incident signals in the presence of spatially correlated noise according to claim 1, wherein:

the correlation matrix is formed by using one arbitrary, two arbitrary, three arbitrary or all four matrixes given by $$\hat{\Phi}_f \equiv \begin{bmatrix} \hat{r}_{1M} & \hat{r}_{2M} & \cdots & \hat{r}_{pM} \\ \hat{r}_{2M} & \hat{r}_{3M} & \cdots & \hat{r}_{p+1,M} \\ \vdots & \vdots & \ddots & \vdots \\ \hat{r}_{L-\bar{q}-1,M} & \hat{r}_{L-\bar{q}M} & \cdots & \hat{r}_{M-\bar{q}-1,M} \end{bmatrix},$$

$$\hat{\Phi}_f \equiv \begin{bmatrix} \hat{r}_{\bar{q}+2,1} & \hat{r}_{\bar{q}+3,1} & \cdots & \hat{r}_{\bar{q}+p+1,1} \\ \hat{r}_{\bar{q}+3,1} & \hat{r}_{\bar{q}+4,1} & \cdots & \hat{r}_{\bar{q}+p+2,1} \\ \vdots & \vdots & \ddots & \vdots \\ \hat{r}_{LI} & \hat{r}_{L+1,1} & \cdots & \hat{r}_{MI} \end{bmatrix},$$

-continued $$\hat{\Phi}_b \equiv \begin{bmatrix} \hat{r}_{1M} & \hat{r}_{1,M-1} & \cdots & \hat{r}_{1L} \\ \hat{r}_{1,M-1} & \hat{r}_{1,M-2} & \cdots & \hat{r}_{1,L-1} \\ \vdots & \vdots & \ddots & \vdots \\ \hat{r}_{1,\bar{q}+p+1} & \hat{r}_{1,\bar{q}+p} & \cdots & \hat{r}_{1,\bar{q}+2} \end{bmatrix},$$

$$\hat{\Phi}_b \equiv \begin{bmatrix} \hat{r}_{M,M-\bar{q}-1} & \hat{r}_{M,M-\bar{q}-2} & \cdots & \hat{r}_{M,L-\bar{q}-1} \\ \hat{r}_{M,M-\bar{q}-2} & \hat{r}_{M,M-\bar{q}-3} & \cdots & \hat{r}_{M,L-\bar{q}-2} \\ \vdots & \vdots & \ddots & \vdots \\ \hat{r}_{Mp} & \hat{r}_{M,p-1} & \cdots & \hat{r}_{MI} \end{bmatrix}$$

when it is assumed that $\hat{r}_{ij}$ is the estimated correlation between the $i^{th}$ element data and the $j^{th}$ element data, M is the number of the antenna elements, p is the number of incident signals (M>2p+$\bar{q}$), and $\bar{q}$ is the spatial correlation length of additive noise (0<$\bar{q}$<M−1).

14. The method for estimating the directions of incident signals according to claim 1, wherein:
the method for estimating the direction of incident signal is realized in a base station.

15. The method for estimating the directions of incident signals according to claim 1, wherein:
the method for estimating the directions of incident signals is realized in a base station, and the base station directs a peak of a receiving beam to a desired direction by using the estimated direction of the incident signal.

16. The method for estimating the directions of incident signals according to claim 1, wherein:
the method for estimating the directions of incident signals is realized in a base station, and the base station directs a transmitting beam to a desired direction by using the estimated direction of incident signal when an antenna transmits a signal.

17. A program for causing an information processing device to execute a method for estimating directions of incident signals, comprising:
obtaining correlations among some of elements data based on received array data obtained by array antenna elements which are linearly arrayed in different spatial positions with uniform element spacings, and forming a correlation matrix from the correlations;
estimating a noise subspace from the correlation matrix by a linear operation; and
calculating a spatial spectrum obtained from the noise subspace or roots of a polynomial, and estimating the directions of incident signals.

18. A storage medium whose content can be read by an information processing device, storing a program which causes an information processing device to execute a method for estimating directions of incident signals, comprising:
obtaining correlations among some elements data based on received array data obtained by array antenna elements which are linearly arrayed in different spatial positions with uniform element spacings, and forming a correlation matrix from the correlations;
estimating a noise subspace from the correlation matrix by a linear operation; and
calculating a spatial spectrum obtained from the noise subspace or roots of a polynomial, and estimating the directions of incident signals.

19. A direction estimating device, comprising:
a correlation matrix defining unit for obtaining correlations among some elements data based on received array data obtained by array antenna elements which are linearly arrayed in different spatial positions with uniform element spacings, and forming a correlation matrix from the correlations;
a noise subspace estimating unit for estimating a noise subspace from the correlation matrix by a linear operation; and
a direction estimating unit for calculating a spatial spectrum obtained from the noise subspace or roots of a polynomial, and estimating a direction of an incident signal.

* * * * *